C. WENDEL & W. FLORICH.
Centrifugal Evaporators.

No. 158,764.

Patented Jan. 12, 1875

UNITED STATES PATENT OFFICE.

CONRAD WENDEL AND WILLIAM FLORICH, OF NEW YORK, N. Y.

IMPROVEMENT IN CENTRIFUGAL EVAPORATORS.

Specification forming part of Letters Patent No. 158,764, dated January 12, 1875; application filed December 5, 1874.

*To all whom it may concern:*

Be it known that we, CONRAD WENDEL and WILLIAM FLORICH, both of the city, county, and State of New York, have invented a certain new and Improved Centrifugal Evaporator, of which the following is a specification:

This invention is illustrated in the accompanying drawing, in which—

Figure 1:
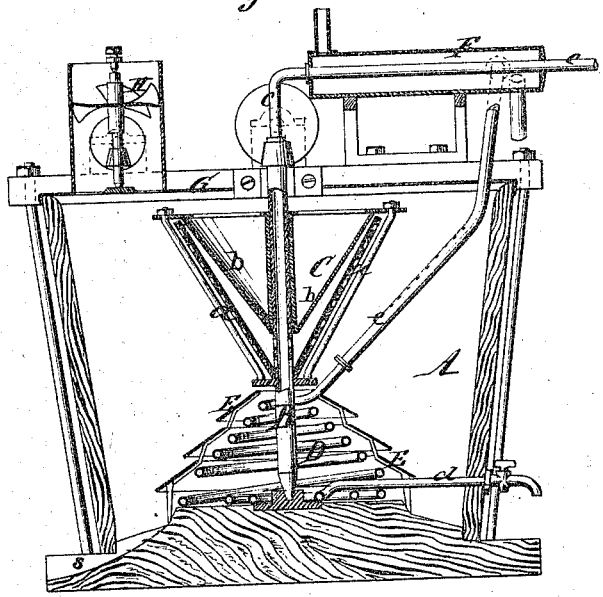
Figure 2:
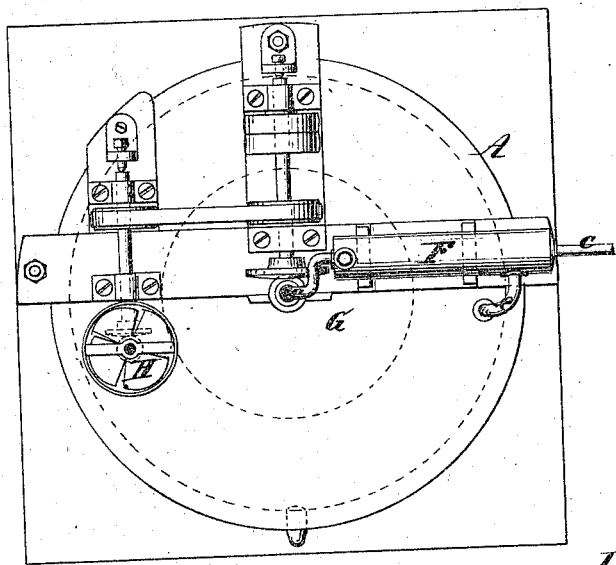

Figure 1 represents a vertical central section. Fig. 2 is a plan or top view.

Similar letters indicate corresponding parts.

This invention consists in an inverted hollow conical drum, which is mounted on a hollow shaft, and the outside jacket of which is perforated with a large number of holes, in combination with a steam-coil situated beneath a series of conical protectors in such a manner that, by revolving the conical drum, the liquid introduced in the same is heated and forced out through the holes in the outer jacket of said drum, and thereby the evaporation of said liquid is effected with rapidity and economy. The liquid which escapes from the conical drum is prevented, by the conical protectors, from coming in contact with the heating-coil. With the conical drum and heating-coil is combined a heater, which receives the exhaust-steam of the heating-coil, and through which the liquid is fed to the conical drum. The conical drum and the heating-coil are situated in a closed vessel, on the top of which is placed an exhaust-fan, so as to rarefy the air in said vessel, for the purpose of promoting the evaporation.

In the drawing, the letter A designates a vessel, through the center of which rises a shaft, B, the upper part of which is made hollow. On this hollow part is mounted a drum, C, which has the form of an inverted hollow cone, the outer jacket *a* of which is foraminous, while its inner jacket, *b*, is of a different angle from that of the outer jacket, so that the hollow space inclosed by said two jackets runs out tapering toward its upper end. The foraminous jacket *a* is lined on its inside with felt or other suitable absorbent material, and through the hollow part of the shaft B extends a pipe, *c*, through which the liquid to be evaporated is introduced. On the bottom of the vessel A is situated a steam-coil, D, which receives steam through a pipe, *d*, and from which steam exhausts through a pipe, *e*. Said steam-coil is situated beneath a series of protectors, E, which prevent the liquid, in escaping out of the conical drum, from coming in contact with the surface of the coil, whereby said liquid is protected against being scorched. The escape-pipe *e* extends up close to the outside of the conical drum, and its side facing said drum is perforated with a number of small holes, so that the steam issuing from said holes will keep the lining of the conical drum soft and in proper working order. Said pipe *e* connects with a heater, F, through which runs the liquid-supply pipe *c*, so that the temperature of the liquid is raised nearly to the boiling-point before it reaches the evaporating-drum.

As the drum C is revolved, the liquid contained therein is forced out in small jets through the holes in the jacket *a*, and as it escapes into the heated atmosphere in the vessel A the volatile portions of the same are evaporated, and the heavy constituents drop down and collect on the bottom of said vessel, whence the same are drawn out by a suitable gate or faucet, S. The vessel A is covered with a closely-fitting lid, G, and on the lid is secured an exhaust fan, H, which serves to rarefy the air in the vessel, for the purpose of promoting the evaporating process. This exhaust-fan also serves to facilitate the removal of steam, which escapes through the holes in the tail-pipe *e*, and which otherwise would accumulate in the vessel A, whereby the evaporation of the liquid would be materially retarded.

What we claim as new, and desire to secure by Letters Patent, is—

1. The conical drum C, mounted on a hollow shaft, B, in combination with the vessel A and coil D, substantially as set forth.

2. The combination of the heater F with the conical drum C, hollow shaft B, vessel A, coil D, and pipe *e*, substantially as shown and described.

3. The perforated tail-pipe $e$ of the coil D, in combination with the conical drum C, vessel A, and coil D, substantially as described.

4. The protector E, in combination with the conical drum C, vessel A, and coil D, substantially as described.

5. The exhaust-fan H, in combination with the closed vessel A, drum C, and steam-coil D, substantially as set forth.

In testimony that we claim the foregoing we have hereunto set our hands and seals this 1st day of December, 1874.

CONRAD WENDEL. [L. S.]
WILLIAM FLORICH. [L. S.]

Witnesses:
W. HAUFF,
E. F. KASTENHUBER.